United States Patent [19]

Forter et al.

[11] 3,997,521

[45] Dec. 14, 1976

[54] BIS-(DIALKOXYCARBONYL-PHENYLAZO)ACETOACETAMIDOARYLENES

[75] Inventors: Willy Forter, Allschwil; Juergen Goldmann, Muenchenstein, both of Switzerland

[73] Assignee: Sandoz Ltd., Basel, Switzerland

[22] Filed: Aug. 7, 1972

[21] Appl. No.: 278,274

Related U.S. Application Data

[63] Continuation-in-part of Ser. No. 90,027, Nov. 16, 1970, abandoned.

[30] Foreign Application Priority Data

| Dec. 3, 1969 | Switzerland | 18000/69 |
| Dec. 4, 1969 | Switzerland | 18072/62 |
| Feb. 4, 1970 | Switzerland | 1557/70 |

[52] U.S. Cl. .................. 260/176; 106/23; 106/288 Q; 106/308 Q; 260/471 R; 260/562 A; 260/562 K

[51] Int. Cl.$^2$ .............. C09B 33/14; C09B 31/10; D06P 1/18; D06P 3/42

[58] Field of Search ................... 260/176

[56] References Cited

UNITED STATES PATENTS

| 1,879,223 | 9/1932 | Hardtmann | 260/176 |
| 3,272,858 | 9/1966 | White | 260/176 |

FOREIGN PATENTS OR APPLICATIONS

| 766,857 | 4/1934 | France | 260/176 |
| 1,076,635 | 7/1967 | United Kingdom | 260/176 |

*Primary Examiner*—Floyd D. Higel
*Attorney, Agent, or Firm*—Gerald D. Sharkin; Richard E. Vila; Melvyn M. Kassenoff

[57] ABSTRACT

Compounds of the formula

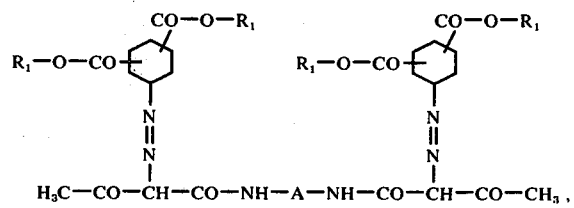

wherein each $R_1$ is alkyl of 1 to 3 carbon atoms, and A is phenylene, substituted phenylene, diphenylene, substituted diphenylene or naphthylene, wherein each substituent of substituted phenylene is independently fluoro, chloro, bromo, methyl, methoxy, ethoxy, trifluoromethyl or cyano and each substituent of substituted diphenylene is independently chloro, bromo, methyl or methoxy, with the proviso the two $CO-O-R_1$ groups on each ring are meta or para to each other. These compounds are eminently suitable as pigments for the mass pigmentation of synthetic polymers and resins such as polyethylene, polystyrene, polyvinyl chloride, poromerics and rubber latices.

9 Claims, No Drawings

BIS-(DIALKOXYCARBONYL-PHENYLAZO)ACETOACETAMIDOARYLENES

This application is a continuation-in-part of application Ser. No. 90 027, filed Nov. 16, 1970, and now abandoned.

It has been found that excellent properties as pigments are shown by compounds of the formula

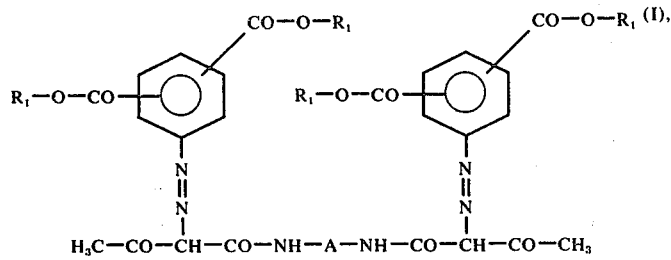

in which the symbols $R_1$ stand for an alkyl group containing 1, 2 or 3 carbon atoms and A stands for unsubstituted phenylene or phenylene substituted by fluorine, chlorine, bromine, methyl, methoxy, ethoxy, trifluoromethyl or cyano, unsubstituted diphenylene or diphenylene substituted by chlorine, bromine, methyl or methoxy, or naphthylene, and in which the groups $-CO-O-R_1$ are bound in meta- or paraposition to each other on the pertinent benzene nuclei.

The compounds of formula (I) are produced by the diazotization of 2 moles of an amine of the formula

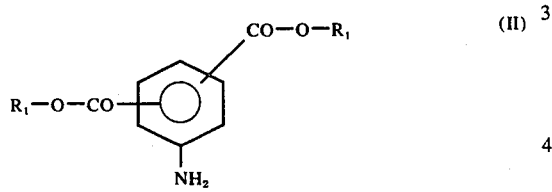

and coupling of the resulting diazonium compound with 1 mole of a compound of the formula

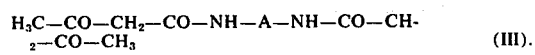

The coupling reaction is generally carried out in weakly acid medium within the temperature range of $-5°$ C to $+20°$ C, more especially at $0°$ C to $+5°$ C. The preferred compounds have the formula The disazo compounds, especially when they are submitted to the normal preparatory treatments for pigments, are suitable for the pigmentation of synthetic polymers and synthetic resins, such as polyethylene, polystyrene, polyvinyl chloride, poromerics (synthetic leather) and rubber latices, in the presence or absence of solvents. Further suitable uses include the dyeing of viscose rayon and cellulose acetate fibres in the spinning solution, the pigmentation of oil and water based paints, including lacquers and enamels, the pigmentation of printing inks, paper dyeing in the stock, and the coloration and printing of textiles.

The yellow coloration imparted by the pigments in these various materials is resistant to migration and fast to light. The fastness to washing, cross dyeing, blind vats, rubbing, overspraying, solvents and bleaching with chlorine, hypochlorite or peroxide is good to very good. The pigments show notably good transparency and heat stability.

In the following Examples the parts and percentages are by weight and the temperatures in degrees centigrade.

EXAMPLE 1

8.4 Parts of 5-amino-iso-phthalic acid dimethyl ester are dissolved in 300 parts of water and 20 parts of concentrated hydrochloric acid with heating. The solution is allowed to cool to $20°$, clarified by filtration and diazotized at $5°$ with 40 parts of 1 normal sodium nitrite solution. The diazo solution is adjusted to pH 4 with 50 % sodium acetate solution, whereupon a solution of 7.6 parts of 1,4-bis-(acetoacetylamino)-2,5-dichlorobenzene in 100 parts of water, cooled to about $+5°$, is slowly dropped in, along with 20 parts of ethanol and 10 parts of 30 % sodium hydroxide solution.

After the coupling reaction is complete, stirring is continued for 1 hour at $80°$, then the precipitate is filtered, washed free from salt and vacuum dried at $70°$.

A loose yellow powder pigment is obtained which has very good migration and heat resistance, light fastness

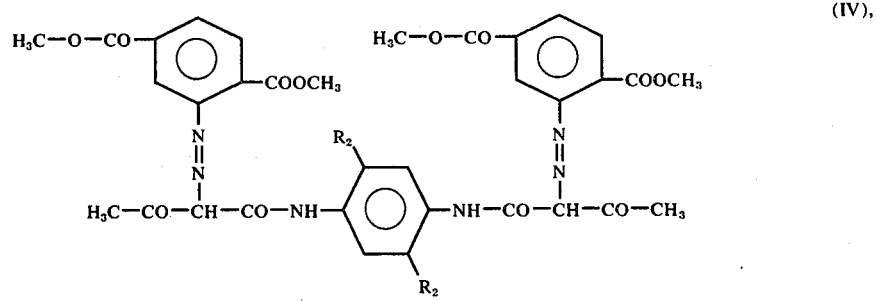

wherein the symbols $R_2$ stand for hydrogen, chlorine, bromine, methyl, methoxy or ethoxy.

and, in paints and lacquers, very good overspraying fastness.

EXAMPLE 2

A solution of 8.4 parts of 2-aminoterephthalic acid dimethylester in 200 parts of water and 10 parts of concentrated hydrochloric acid is stirred for 2 hours at room temperature. It is then poured onto 200 parts of ice and diazotized with 40 parts of 1 normal sodium nitrite solution. The clear diazo solution is adjusted to pH 4 with 50 % sodium acetate solution and to it is slowly added a solution of 7.15 parts of 1,4-bis-(acetoacetylamino)-2-chloro-5-methylbenzene in 100 parts of water, cooled to about +5°, together with 20 parts of ethanol and 10 parts of 30 % sodium hydroxide solution.

Subsequent to coupling, the mixture is stirred for 1 hour at 80°; then the product is isolated by filtration, freed from salt by washing with hot water, and dried at 70° with vacuum. It is a loose yellow pigment with notably good migration and heat resistance, light and overspraying fastness.

The procedures of Examples 1 or 2 can be employed with the diazo and coupling components named in columns I and II of the following Table below, the pigments thus formed having the shades noted in column III of the table.

TABLE

| Example No. | I | II | III |
|---|---|---|---|
| 3 | 2-Amino-isophthalic acid dimethyl ester | 1,4-Bis-(acetoacetylamino)-benzene | yellow |
| 4 | '' | 1,4-Bis-(acetoacetylamino)-2,5-dimethylbenzene | '' |
| 5 | '' | 1,4-Bis-(acetoacetylamino)-2,5-dimethoxybenzene | orange |
| 6 | '' | 1,4-Bis-(acetoacetylamino)-2-methyl-5-chlorobenzene | yellow |
| 7 | '' | 1,4-Bis-(acetoacetylamino)-2-methylbenzene | '' |
| 8 | '' | 1,4-Bis-(acetoacetylamino)-2-chlorobenzene | '' |
| 9 | '' | 1,4-Bis-(acetoacetylamino)-2-methoxybenzene | '' |
| 10 | '' | 1,4-Bis-(acetoacetylamino)-2-methoxy-5-chlorobenzene | '' |
| 11 | '' | 1,4-Bis-(acetoacetylamino)-2,3,5,6-tetrachlorobenzene | '' |
| 12 | '' | 1,4-Bis-(acetoacetylamino)-2,5-dimethyl-3,6-dichlorobenzene | '' |
| 13 | '' | 4,4'-Bis-(acetoacetylamino)-diphenyl | '' |
| 14 | '' | 4,4'-Bis-(acetoacetylamino)-3,3'-dichlorodiphenyl | '' |
| 15 | 2-Amino-isophthalic acid dimethyl ester | 4,4'-Bis-(acetoacetylamino)-3,3'-dimethyldiphenyl | yellow |
| 16 | '' | 4,4'-Bis-(acetoacetylamino)-3,3'-dimethoxydiphenyl | '' |
| 17 | '' | 4,4'-Bis-(acetoacetylamino)-2,2'-dichloro-5,5'-dimethyldiphenyl | '' |
| 18 | '' | 1,5-Bis-(acetoacetylamino)-naphthalene | '' |
| 19 | '' | 1,4-Bis-(acetoacetylamino)-2-trifluoromethylbenzene | '' |
| 20 | 2-Aminoterephthalic acid dimethyl ester | 1,4-Bis-(acetoacetylamino)-benzene | '' |
| 21 | '' | 1,4-Bis-(acetoacetylamino)-2-chlorobenzene | '' |
| 22 | '' | 1,4-Bis-(acetoacetylamino)-2,5-dibromobenzene | '' |
| 23 | '' | 1,4-Bis-(acetoacetylamino)-2-methylbenzene | '' |
| 24 | '' | 1,4-Bis-(acetoacetylamino)-2,5-dimethoxybenzene | orange |
| 25 | '' | 1,4-Bis-(acetoacetylamino)-2-methoxybenzene | yellow |
| 26 | '' | 4,4'-Bis-(acetoacetylamino)-diphenyl | '' |
| 27 | '' | 4,4'-Bis-(acetoacetylamino)-3,3'-dichlorodiphenyl | '' |
| 28 | 2-Aminoterephthalic acid dimethyl ester | 4,4'-Bis-(acetoacetylamino)-3,3'-dimethoxydiphenyl | yellow |
| 29 | '' | 4,4'-Bis-(acetoacetylamino)-3,3'-dimethyldiphenyl | '' |
| 30 | '' | 1,4-Bis-(acetoacetylamino)-2,5-dimethylbenzene | '' |
| 31 | '' | 1,4-Bis-(acetoacetylamino)-2-methyl-5-methoxybenzene | '' |
| 32 | '' | 1,4-Bis-(acetoacetylamino)-2-methoxy-5-chlorobenzene | '' |
| 33 | 2-Aminoterephthalic acid dimethyl ester | 1,4-Bis-(acetoacetylamino)-2-bromobenzene | yellow |
| 34 | '' | 1,4-Bis-(acetoacetylamino)-2-trifluoromethylbenzene | '' |
| 35 | '' | 1,4-Bis-(acetoacetylamino)-2,5-diethoxybenzene | orange |
| 36 | '' | 1,4-Bis-(acetoacetylamino)-2,3,5,6-tetrachlorobenzene | yellow |
| 37 | '' | 1,4-Bis-(acetoacetylamino)-2,3,5,6-tetramethylbenzene | '' |
| 38 | '' | 1,4-Bis-(acetoacetylamino)-2,5-dimethyl-3,6-dichlorobenzene | '' |
| 39 | '' | 2,7-Bis-(acetoacetylamino)-naphthalene | '' |
| 40 | 2-Aminoterephthalic acid dimethyl ester | 1,4-Bis-(acetoacetylamino)-2,6-dichlorobenzene | yellow |
| 41 | '' | 1,4-Bis-(acetoacetylamino)-2,6-dimethylbenzene | '' |
| 42 | '' | 1,4-Bis-(acetoacetylamino)-naphthalene | '' |
| 43 | '' | 1,5-Bis-(acetoacetylamino)-naphthalene | '' |
| 44 | 2-Aminoterephthalic acid dimethyl ester | 2,6-Bis-(acetoacetylamino)-naphthalene | yellow |
| 45 | 4-Amino-isophthalic acid dimethyl ester | 1,4-Bis-(acetoacetylamino)-benzene | '' |
| 46 | '' | 1,4-Bis-(acetoacetylamino)-2,5-dichlorobenzene | '' |
| 47 | 5-Aminoterephthalic acid diethyl ester | 1,4-Bis-(acetoacetylamino)-benzene | '' |
| 48 | 5-Aminoterephthalic acid di-N-propyl ester | 1,4-Bis-(acetoacetylamino)-2,5-dichlorobenzene | '' |
| 49 | 2-Aminoterephthalic acid dimethyl ester | 1,4-Bis-(acetoacetylamino)-2,5-difluorobenzene | '' |
| 50 | '' | 1,4-Bis-(acetoacetylamino)-2,5-dichlorobenzene | '' |
| 51 | 2-Aminoterephthalic-di-methylester | 1,4-Bis-(acetoacetylamino)-2,5-diethoxybenzene | orange |
| 52 | '' | 1,4-Bis-(acetoacetylamino)-2,5-dimethylbenzene | yellow |
| 53 | '' | 1,4-Bis-(acetoacetylamino)-2-methoxy-5-chlorobenzene | '' |
| 54 | '' | 1,4-Bis-(acetoacetylamino)-2-methoxy-5- | '' |

TABLE-continued

| Example No. | I | II | III |
|---|---|---|---|
| | | methylbenzene | |

Representative dyestuffs of the foregoing Examples have formulae (a) 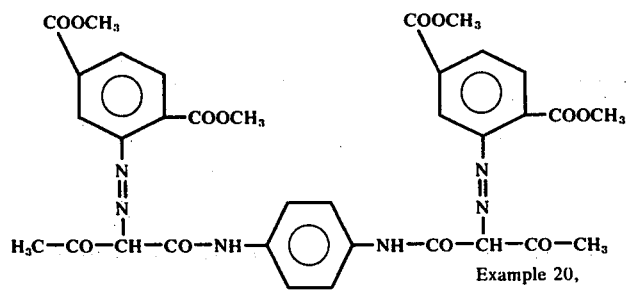

Example 20, (b) 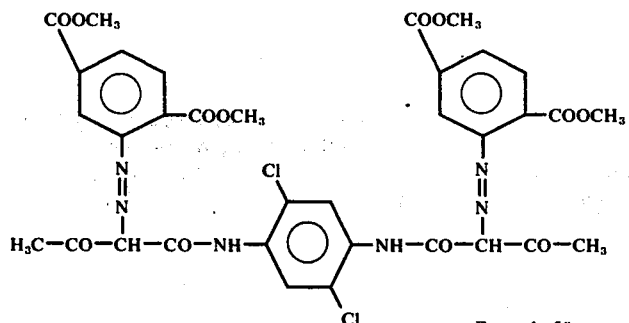

Example 50, (c) 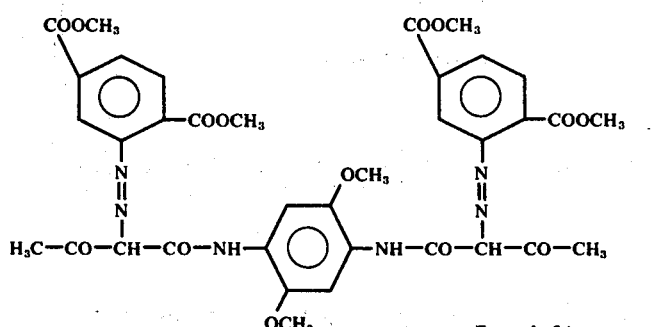

Example 24 and (d) 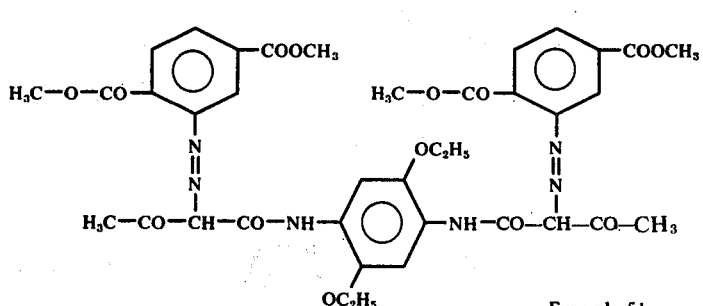

Example 51.

Having thus disclosed the invention what we claim is:

1. A compound of the formula

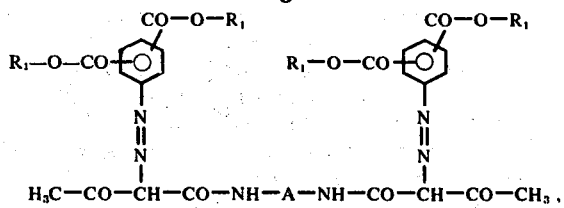

wherein each
R₁ is alkyl of 1 to 3 carbon atoms, and
A is phenylene, phenylene substituted by fluoro, chloro, bromo, methyl, methoxy, ethoxy, trifluoromethyl or cyano, diphenylene, diphenylene substituted by chloro, bromo, methyl or methoxy or naphthylene, with the provisos that (1) when A is substituted phenylene or substituted diphenylene having more than one substituent, the substituents are the same or different, and (2) the two —CO—O—$R_1$ groups on each benzene ring are meta or para to each other.

2. A compound according to claim 1 wherein
A is 1,4-phenylene, 1,4-phenylene substituted by 1 to 4 substituents, 4,4'-diphenylene, 4,4'-diphenylene substituted by 1 or 2 substituents on each benzene ring, 1,4-naphthylene, 1,5-naphthylene, 2,6-naphthylene or 2,7-naphthylene.

3. A compound according to claim 1 wherein each $R_1$ is methyl.

4. A compound according to claim 3 wherein
A is 1,4-phenylene or 1,4-phenylene substituted by 1 to 4 substituents.

5. A compound according to claim 4 having the formula

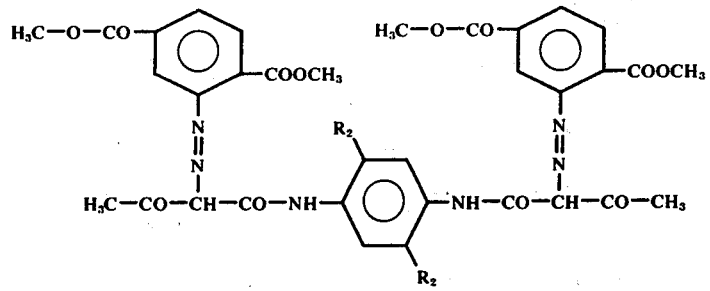

wherein each $R_2$ is independently hydrogen, chloro, bromo, methyl, methoxy or ethoxy.

6. The compound according to claim 5 having the formula

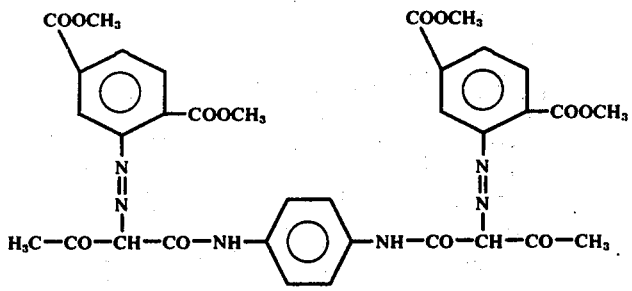

7. The compound according to claim 5 having the formula

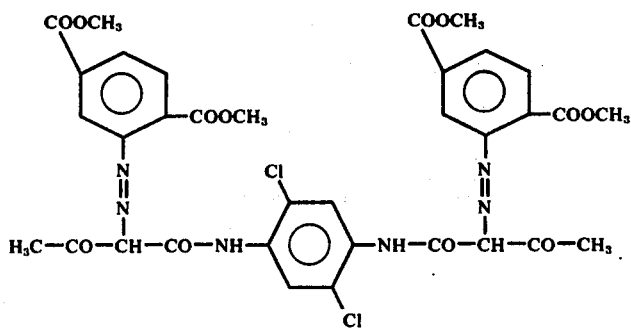

8. The compound according to claim 5 having the formula

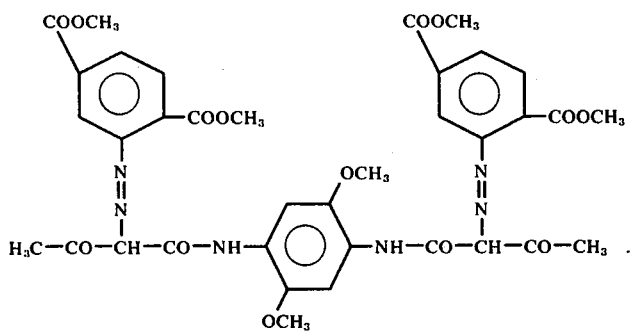
9. The compound according to claim 5 having the formula
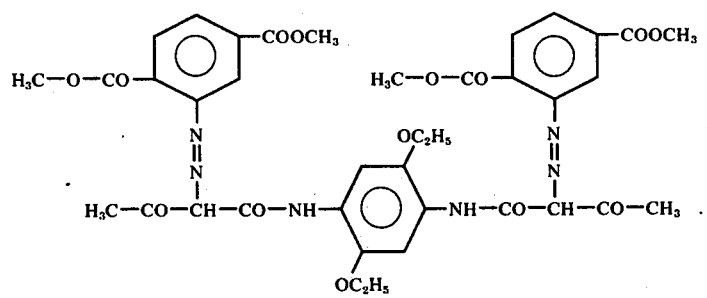
* * * * *